(12) United States Patent
Baba

(10) Patent No.: US 7,590,108 B2
(45) Date of Patent: Sep. 15, 2009

(54) COMPOSITE COMPUTER APPARATUS AND MANAGEMENT METHOD THEREOF

(75) Inventor: Takashige Baba, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 11/195,666

(22) Filed: Aug. 3, 2005

(65) Prior Publication Data

US 2006/0059456 A1   Mar. 16, 2006

(30) Foreign Application Priority Data

Sep. 10, 2004   (JP) ............................. 2004-263164

(51) Int. Cl.
*H04J 1/16*   (2006.01)
*H04J 3/14*   (2006.01)
*H04J 3/16*   (2006.01)
*H04J 3/22*   (2006.01)
*H04L 12/50*   (2006.01)
*H04Q 11/00*   (2006.01)

(52) U.S. Cl. ....................... 370/357; 370/230; 370/362; 370/364; 370/365; 370/466

(58) Field of Classification Search ................ 370/230, 370/362, 364, 365, 466
See application file for complete search history.

(56) References Cited

U.S. PATENT DOCUMENTS

| | | | |
|---|---|---|---|
| 6,188,759 B1 * | 2/2001 | Lorenzen et al. ....... | 379/220.01 |
| 7,389,367 B2 * | 6/2008 | Baba et al. ..................... | 710/38 |
| 2002/0034181 A1 * | 3/2002 | Kalkunte et al. ............ | 370/392 |
| 2003/0097428 A1 * | 5/2003 | Afkhami et al. ............. | 709/220 |
| 2004/0047286 A1 * | 3/2004 | Larsen et al. ............... | 370/216 |
| 2004/0081104 A1 * | 4/2004 | Pan et al. ..................... | 370/254 |
| 2004/0257989 A1 * | 12/2004 | Lingafelt et al. ............ | 370/230 |
| 2005/0058063 A1 * | 3/2005 | Masuyama et al. .......... | 370/217 |
| 2005/0071675 A1 * | 3/2005 | Chu et al. .................... | 713/201 |
| 2005/0215128 A1 * | 9/2005 | Levy et al. ................... | 439/894 |
| 2005/0265385 A1 * | 12/2005 | Cromer et al. .............. | 370/466 |

OTHER PUBLICATIONS

"IBM BladeCenter 4-Port Gb Ethernet Switch Module and User's Guide", which describe in the specification.

* cited by examiner

*Primary Examiner*—Daniel J Ryman
*Assistant Examiner*—Andrew Oh
(74) *Attorney, Agent, or Firm*—Brundidge & Stanger, P.C.

(57) ABSTRACT

In network setting, when setting inputted from a management terminal is inputted into management agent of a CPU blade, the management agent performs network setting to a device driver of the CPU blade, performs setting of NIC to the device driver of the CPU blade and creates network setting information required for a port of an Ethernet switch module unit connected to the NIC to notify the same to a management module unit. The management module unit recognizes a port of Ethernet switch module units which corresponds to the NIC and performs network setting to the port of the Ethernet switch module based on the acquired network configuration information. Accordingly, a technology capable of easily performing the setting of network in a composite computer apparatus in a short time is provided.

12 Claims, 10 Drawing Sheets

*FIG. 3*

| ETHERNET SWITCH MODULE UNIT NUMBER | INTERNAL PORT NUMBER | CPU BLADE NUMBER | NIC NUMBER | MAC ADDRESS OF NIC |
|---|---|---|---|---|
| 0 | i1 | 1 | 1 | XX:XXXX:XX:XX:X0 |
| ... | ... | ... | ... | ... |
| 0 | in | n | 1 | XX:XXXX:XX:XX:Y0 |
| 1 | i1 | 1 | 2 | XX:XXXX:XX:XX:Z0 |
| ... | ... | ... | ... | ... |
| 1 | in | n | 2 | XX:XXXX:XX:XX:L0 |

FIG. 7

| SETTING CONTENTS OF DEVICE DRIVER | COMMUNICATION DATA BETWEEN MANAGEMENT AGENT AND MANAGEMENT MODULE UNIT | SETTING CONTENTS OF ETHERNET SWITCH PORT |
|---|---|---|
| · SETTING OF NUMBER OF Tag-VLANs<br>· SETTING OF Tag-VLAN ID<br>· SETTING OF IP ADDRESS TO Tag-VLAN<br>· SETTING TO ENABLE GVRP (GARP VLAN Registration Protocol) | · MAC ADDRESS INFORMATION OF NIC<br>· CPU BLADE NUMBER INFORMATION OF NIC<br>· Tag-VLAN ID<br>· Priority INFORMATION TO Tag-VLAN ID<br>· SETTING TO ENABLE GVRP | · SETTING OF Tag-VLAN ID<br>· Priority SETTING TO Tag-VLAN ID<br>· SETTING OF CoS CLASS OF SWITCH TO Priority<br>· SETTING TO ENABLE GVRP |

FIG. 8

| SETTING CONTENTS OF DEVICE DRIVER | COMMUNICATION DATA BETWEEN MANAGEMENT AGENT AND MANAGEMENT MODULE UNIT | SETTING CONTENTS OF ETHERNET SWITCH PORT |
|---|---|---|
| • SETTING OF TEAMING NIC<br>• SETTING OF IP ADDRESS<br>• SETTING OF ADAPTER FAULT TOLERANT | • MAC ADDRESS INFORMATION OF NIC<br>• CPU BLADE NUMBER INFORMATION OF NIC<br>• SETTING INFORMATION OF SPANNING TREE PROTOCOL | • SETTING OF SPANNING TREE PROTOCOL |

FIG. 9

| SETTING CONTENTS OF DEVICE DRIVER | COMMUNICATION DATA BETWEEN MANAGEMENT AGENT AND MANAGEMENT MODULE UNIT | SETTING CONTENTS OF ETHERNET SWITCH PORT |
|---|---|---|
| · SETTING OF TEAMING NIC<br>· SETTING OF IP ADDRESS<br>· SETTING OF SWITCH FAULT TOLERANT | · MAC ADDRESS INFORMATION OF NIC<br>· CPU BLADE NUMBER INFORMATION OF NIC<br>· SETTING INFORMATION OF SPANNING TREE PROTOCOL | · SETTING OF SPANNING TREE PROTOCOL |

FIG. 10

| SETTING CONTENTS OF DEVICE DRIVER | COMMUNICATION DATA BETWEEN MANAGEMENT AGENT AND MANAGEMENT MODULE UNIT | SETTING CONTENTS OF ETHERNET SWITCH PORT |
|---|---|---|
| · SETTING OF TEAMING NIC<br>· SETTING OF IP ADDRESS<br>· SETTING OF LOAD BALANCING | · MAC ADDRESS INFORMATION OF NIC<br>· CPU BLADE NUMBER INFORMATION OF NIC<br>· SETTING INFORMATION OF LOAD BALANCING | · SETTING OF LOAD BALANCING |

COMPOSITE COMPUTER APPARATUS AND MANAGEMENT METHOD THEREOF

CROSS-REFERENCE TO RELATED APPLICATION

The present application claims priority from Japanese Patent Application No. JP 2004-263164 filed on Sep. 10, 2004, the content of which is hereby incorporated by reference into this application.

TECHNICAL FIELD OF THE INVENTION

The present invention relates to a technology for managing a computer system. More particularly, it relates to a technology effectively applied to the network setting in a composite computer apparatus.

BACKGROUND OF THE INVENTION

As a main server for a main enterprise system or the like, a composite computer system, a so-called blade server has been known. The blade server is a high density server in which a plurality of CPU blades each having functions such as a CPU, a memory, a hard disk, and the like provided on one circuit board are mounted according to need in a casing called "enclosure".

In some blade servers, a Tag-VLAN (Virtual Local Area network) function which sets a NIC (Network Interface Card) mounted on the CPU blade logically as a plurality of NICs is provided.

When the Tag-VLAN function is used, the number of logic NICs prepared for one NIC driver serving as a device driver of the CPU blade and VLAN-IDs corresponding to the respective logic NICs are set from a management terminal connected to the blade server.

Subsequently, on a side of a Ethernet switch provided on the blade server, the enable setting of the Tag-VLAN to a port physically connected to the NIC on which the Tag-VLAN setting has been performed, the setting of corresponding VLAN-ID and the setting of a priority, if necessary, are performed.

Incidentally, a method for setting a VLAN in such a blade server has been described in IBM BladeCenter 4-Port Gb Ethernet Switch Module Installation and User's Guide" issued by JAPAN IBM CORP. in April, 2004.

SUMMARY OF THE INVENTION

However, the inventor has found that there is the following problem in the technology for setting a network in such a composite computer system.

That is, in order to set the logic NIC via the Tag-VLAN, as described above, the setting of the NIC driver in the CPU blade and the setting of the Ethernet switch must be performed independently from each other, and it is further necessary to confirm association of the NIC, the Ethernet switch, and the Ethernet switch port with one another.

As a result, problems of not only the increase of the number of steps for setting and a cost thereof but also setting errors may occur.

For example, in the setting performed via the Ethernet switch, if an error occurs in a setting procedure, mismatching occurs between the driver setting in the CPU blade and the setting of the Ethernet switch. As a result, it becomes impossible to access the CPU blade from the management terminal.

An object of the present invention is to provide a technology which can perform the setting of a network in a composite computer apparatus easily in a short time.

The above and other objects and novel characteristics of the present invention will be apparent from the description of this specification and the accompanying drawings.

The typical ones of the inventions disclosed in this application will be briefly described as follows.

The present invention provides a composite computer apparatus comprising: at least one CPU module unit mounted with at least one Ethernet interface controller and a processor; at least one Ethernet switch module unit which is provided with an internal port connected to the Ethernet interface controller of the CPU module unit via Ethernet (registered trademark) and an external port connected to at least one external network; and at least one management module unit which is connected to the at least one CPU module unit and the at least one Ethernet switch module unit via an internal network and performs management of the at least one CPU module unit, wherein the management module unit has network configuration information showing a correspondence relationship between the Ethernet interface controller of the CPU module unit and the internal port of the Ethernet switch module unit, the CPU module unit has a device driver which sets the Ethernet interface controller on a computer apparatus comprised of the CPU module unit and a management agent unit which is externally connected to the composite computer apparatus to perform setting of the device driver of the Ethernet interface controller through communication with a management terminal for performing management of the composite computer apparatus, when network setting is performed to the Ethernet interface controller of the CPU module unit through the communication with the management terminal, the CPU module unit performs network setting of the Ethernet interface controller of the CPU module unit to the management agent unit operating on the CPU module unit through the communication with the management terminal at a time of the setting of the internal port of the Ethernet switch module unit connected to the Ethernet interface controller, the management agent unit performs setting to a driver of the Ethernet interface controller of the CPU module unit and creates network setting information required for a port of the Ethernet switch module unit connected to the Ethernet interface controller of the CPU module unit to notify the network setting information to the management module unit, and the management module unit identifies an internal port of the Ethernet switch module unit to be set from the network configuration information to perform network setting in accordance with the network setting information to the internal port of the Ethernet switch module unit.

Also, the present invention provides a composite computer apparatus comprising:

at least one CPU module unit which is provided with at least one I/O adapter and a processor;

at least one I/O switch module unit which has at least one network interface controller, and connects the network interface controller and the I/O adapter of the CPU module unit via an I/O switch;

at least one Ethernet switch module unit which is provided with at least one internal port and is connected with the network interface controller of the I/O switch module unit via Ethernet (registered trademark), and has an external port connected to at least one external network; and a management module unit which is connected to the at least one CPU module unit, the I/O switch module unit, and the at least one Ethernet switch module unit, and performs management of the at least one CPU module unit, where the management module unit performs control of the I/O switch module unit to be capable of changing the number of the network interface controllers to be allocated to the CPU module unit, wherein the management module unit has network configuration information showing a correspondence relationship between the Ethernet interface controller of the CPU module unit and the internal port of the Ethernet switch module unit, the CPU module unit has a device driver which sets the Ethernet interface controller on a computer apparatus comprised of the CPU module unit and a management agent unit which is externally connected to the composite computer apparatus to perform setting of the device driver of the Ethernet interface controller through communication with a management terminal for performing management of the composite computer apparatus, when network setting is performed to the Ethernet interface controller of the CPU module unit through the communication with the management terminal, the CPU module unit performs network setting of the Ethernet interface controller of the CPU module unit to the management agent unit operating on the CPU module unit through the communication with the management terminal at a time of the setting of the internal port of the Ethernet switch module unit connected to the Ethernet interface controller, the management agent unit performs setting to a driver of the Ethernet interface controller of the CPU module unit and creates network setting information required for a port of the Ethernet switch module unit connected to the Ethernet interface controller of the CPU module unit to notify the network setting information to the management module unit, and the management module unit identifies an internal port of the Ethernet switch module unit to be set from the network configuration information to perform network setting in accordance with the network setting information to the internal port of the Ethernet switch module unit.

Also, an outline of the other invention of this application will be described in brief.

The present invention provides a management method of a composite computer apparatus, the composite computer apparatus comprising: at least one CPU module unit which has at least one Ethernet interface controller and is mounted with a processor; at least one Ethernet switch module unit which is provided with at least one internal port connected to the Ethernet interface controller of the CPU module unit via Ethernet (registered trademark) and an external port connected to at least one external network; and at least one management module unit which is connected to the at least one CPU module unit and the at least one Ethernet switch module unit and performs management of the at least one CPU module unit, wherein the management module unit has network configuration information showing a correspondence relationship between the Ethernet interface controller of the CPU module unit and the internal port of the Ethernet switch module unit, when network setting is performed to the Ethernet interface controller of the CPU module unit, management of a device driver which sets the Ethernet interface controller on a computer apparatus comprised of the CPU module unit is performed via communication with a management terminal which is externally connected to the composite computer apparatus to perform management of the composite computer apparatus at a time of the setting of the internal port of the Ethernet switch module unit connected to the Ethernet interface controller, network setting of the Ethernet interface controller of the CPU module unit is performed to a management agent unit operating on the CPU module unit, the management agent unit performs setting of the device driver of the CPU module unit and creates network setting information required for a port of the Ethernet switch module unit connected to the Ethernet interface controller of the CPU module unit, and the management agent unit notifies the network setting information to the management module unit, and the management module unit identifies an internal port of the Ethernet switch module unit to be set from network configuration information and performs a network setting method in accordance with the network setting information to the internal port of the Ethernet switch module unit.

The effect obtained by the representative one of the inventions disclosed in this application will be briefly described as follows.

(1) Since the network setting to the CPU module unit and the Ethernet switch module unit can be performed by only one setting operation, the occurrence of the setting error can be considerably reduced.

(2) According to the above (1), management cost for the composite computer apparatus and the number of management steps can be remarkably reduced and the reliability can be improved.

BRIEF DESCRIPTIONS OF THE DRAWINGS

FIG. 3 is an explanatory diagram showing one example of network configuration information possessed by a module managing unit provided in the composite computer system in FIG. 1;

FIG. 7 is an explanatory diagram showing setting contents when the setting of Tag-VLAN is performed as the network setting of the blade server provided in the composite computer system in FIG. 1;

FIG. 8 is an explanatory diagram showing setting contents when the setting of adapter fault tolerant is performed as the network setting of the blade server provided in the composite computer system in FIG. 1;

FIG. 9 is an explanatory diagram showing setting contents when the setting of switch fault tolerant is performed as the network setting of the blade server provided in the composite computer system in FIG. 1;

FIG. 10 is an explanatory diagram showing setting contents when the setting of load balancing is performed as the network setting of the blade server provided in the composite computer system in FIG. 1.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
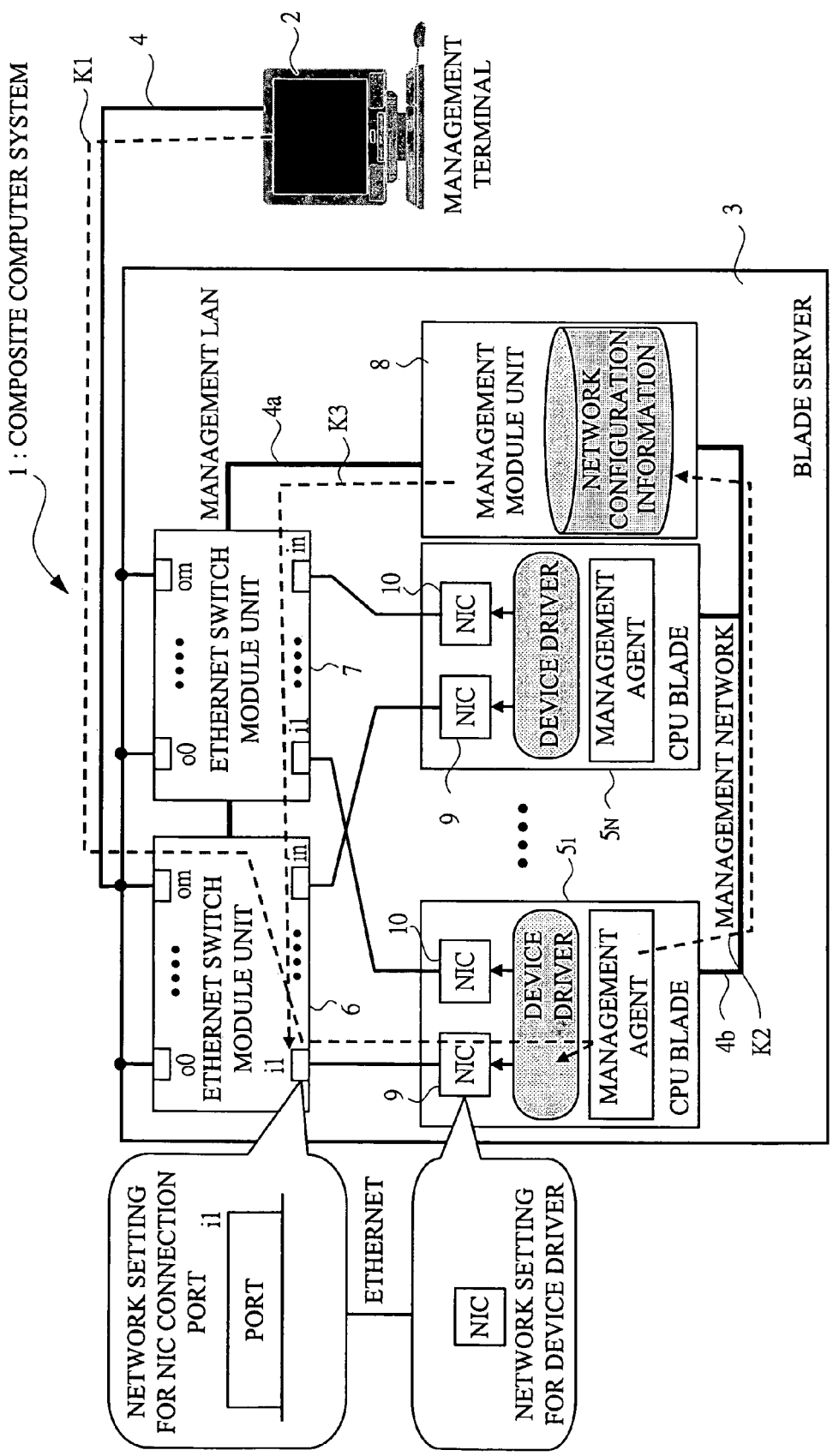
FIG. 1 is a block diagram of a composite computer system according to one embodiment of the present invention.
Figure 2:
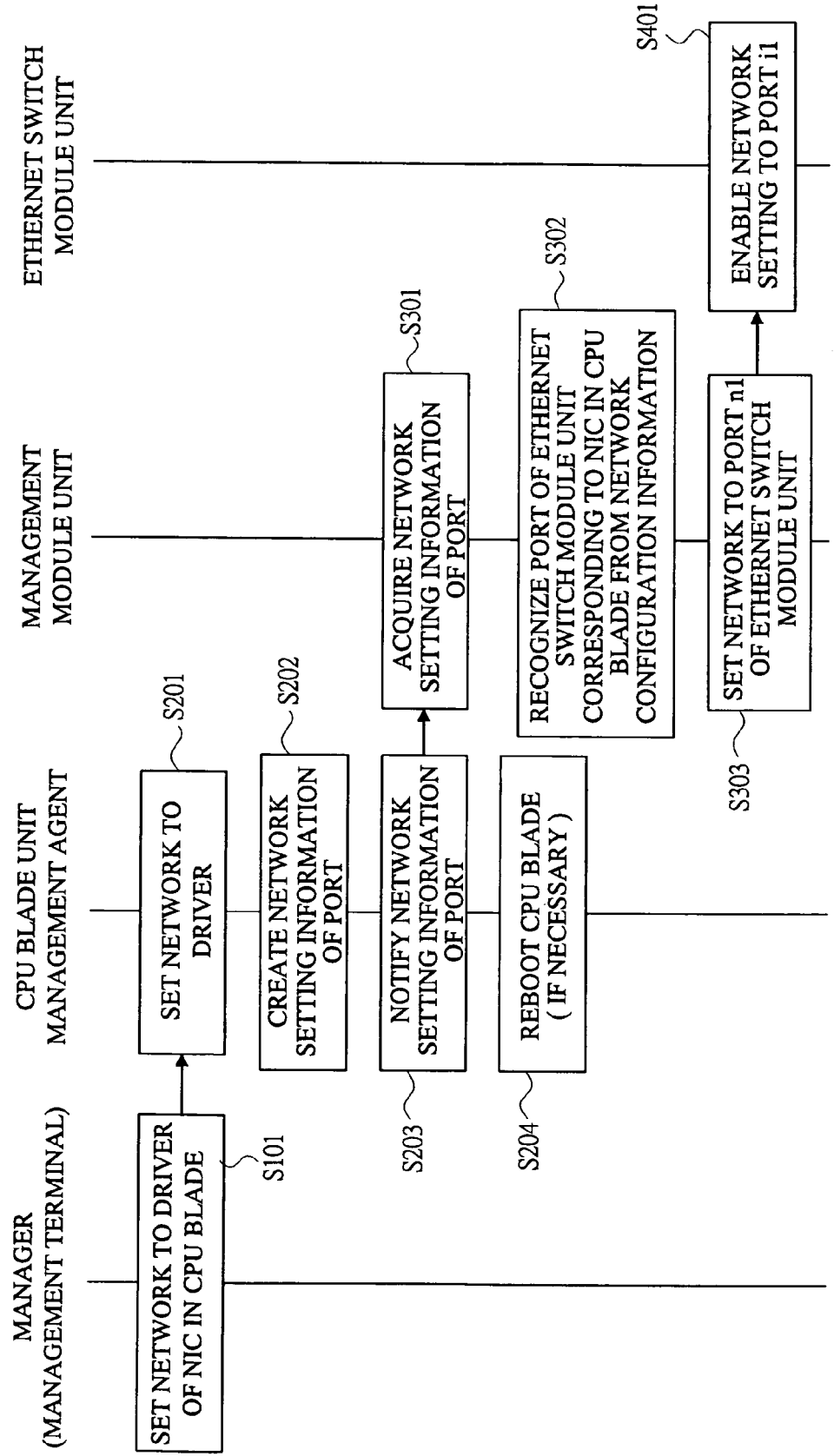
FIG. 2 is a flowchart of network setting in the composite computer system in FIG. 1.
Figure 4:
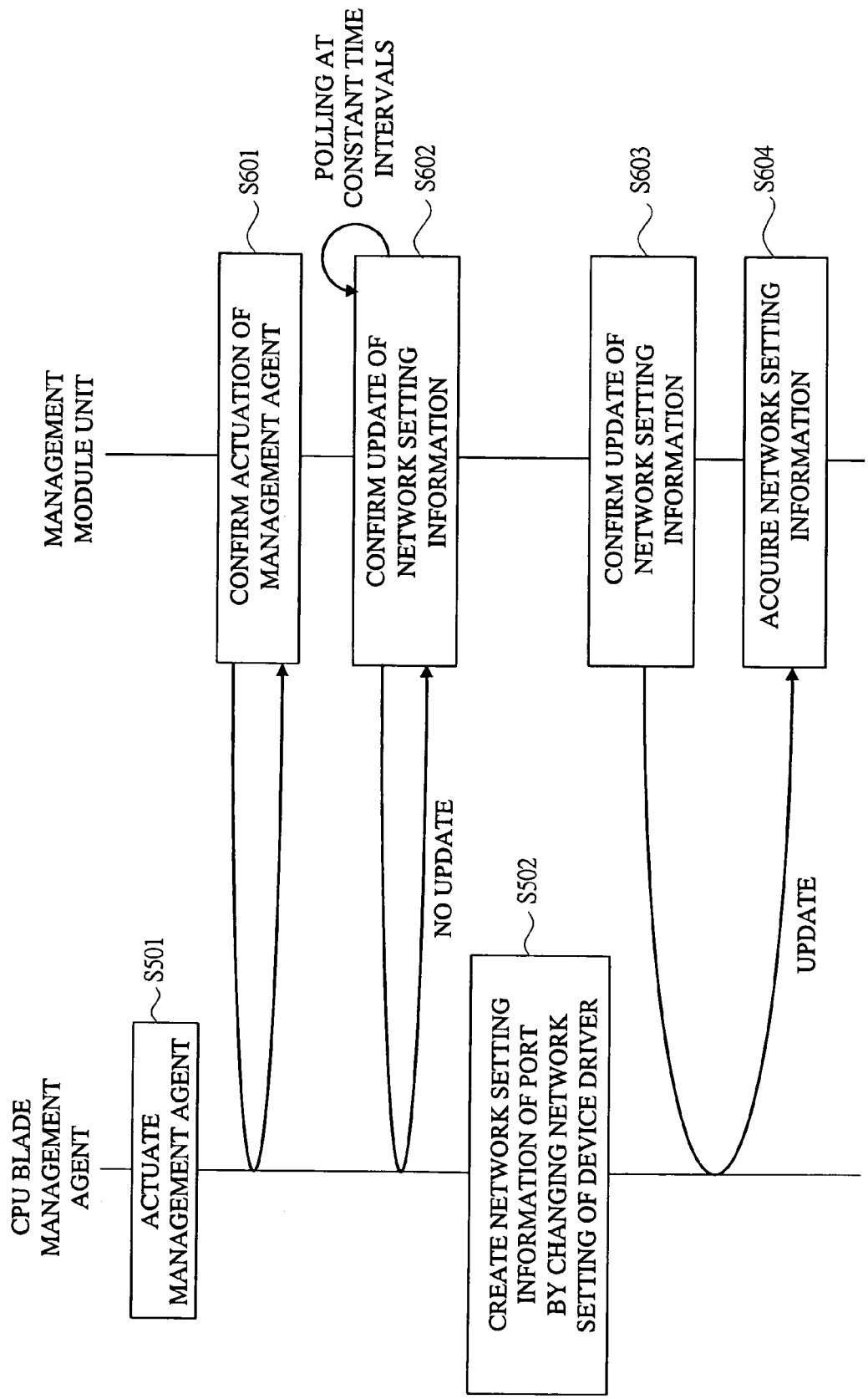
FIG. 4 is a flowchart showing one example of a communication processing performed when network setting information is acquired in a blade server provided in the composite computer system in FIG. 1.
Figure 5:
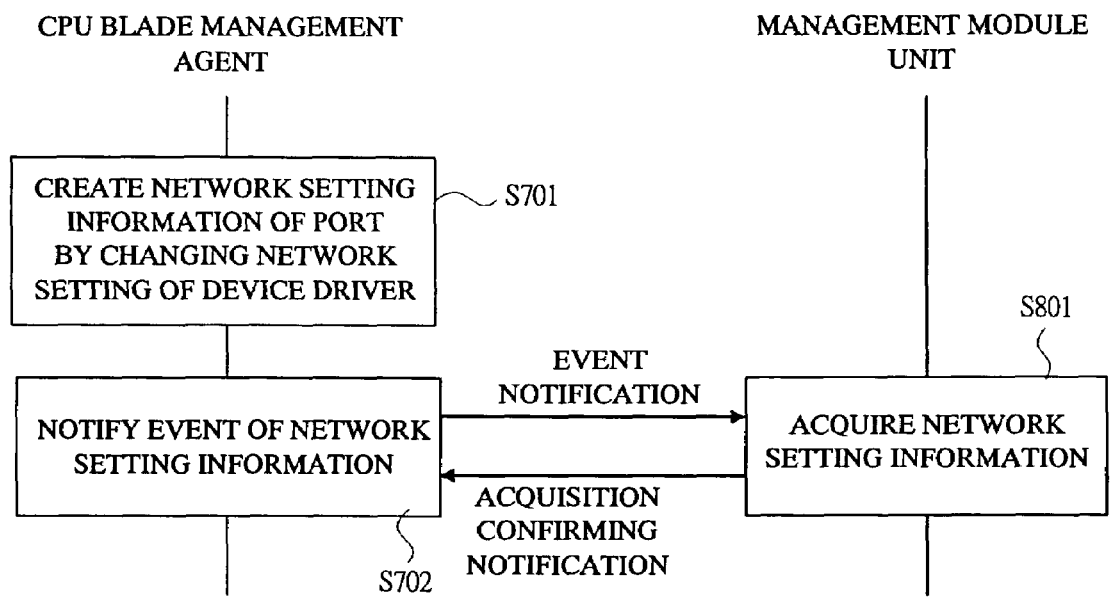
FIG. 5 is a flowchart showing another example of a communication processing in FIG. 4.
Figure 6:
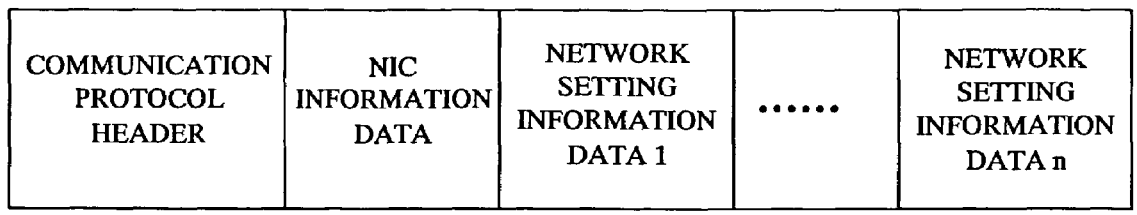
FIG. 6 is an explanatory diagram showing one example of a data structure of network setting information used in the blade server provided in the composite computer system in FIG. 1.

FIG. 1 is a block diagram of a composite computer system according to an embodiment of the present invention, FIG. 2 is a flowchart of network setting in the composite computer system in FIG. 1, FIG. 3 is an explanatory diagram showing one example of network configuration information possessed by a module managing unit provided in the composite computer system in FIG. 1, FIG. 4 is a flowchart showing one example of a communication processing performed when network setting information is acquired in a blade server provided in the composite computer system in FIG. 1, FIG. 5 is a flowchart showing another example of a communication processing in FIG. 4, FIG. 6 is an explanatory diagram showing one example of a data structure of network setting information used in the blade server provided in the composite computer system in FIG. 1, FIG. 7 is an explanatory diagram showing setting contents when the setting of Tag-VLAN is performed as the network setting of the blade server provided in the composite computer system in FIG. 1, FIG. 8 is an explanatory diagram showing setting contents when the setting of adapter fault tolerant is performed as the network setting of the blade server provided in the composite computer system in FIG. 1, FIG. 9 is an explanatory diagram showing setting contents when the setting of switch fault tolerant is performed as the network setting of the blade server provided in the composite computer system in FIG. 1, and FIG. 10 is an explanatory diagram showing setting contents when the setting of load balancing is performed as the network setting of the blade server provided in the composite computer system in FIG. 1.

In this embodiment, as shown in FIG. 1, a composite computer system 1 is comprised of a management terminal 2 and a blade server (composite computer apparatus) 3. The management terminal 2 is connected with the blade server 3 via a communication path 4, and the management terminal 2 serves to control the blade server 3.

The blade server 3 is comprised of a plurality of CPU blades (CPU module unit) $5_1$ to $5_N$, Ethernet switch module units 6 and 7, and a management module unit 8. Each of the CPU blades $5_1$ (to $5_N$) is comprised of such a storage module as a memory or a hard disk, a microprocessor, Ethernet interface controllers typified by NICs (Ethernet interface controller) 9 and 10, and the like disposed on one wiring board.

The NICs 9 and 10 are connected to the Ethernet switch module units 6 and 7 via Ethernet. The Ethernet switch module units 6 and 7 are connected to the management module unit 8 via a communication path 4a such as a management LAN.

Each of the Ethernet switch module units 6 and 7 is one hub which is a repeater for a network and functions as a switching hub. Further, the management module unit 8 is mutually connected to the CPU blades $5_1$ to $5_N$ via a communication path 4b such as a management network.

The management module unit 8 has network configuration information, and when receiving a request from the management terminal 2, the management module unit 8 controls the NIC setting based upon the network configuration information. The network configuration information includes information indicating a correspondence relationship between the respective NICs 9 and 10 in the CPU blades $5_1$ to $5_N$ and internal ports in the Ethernet switch module units 6 and 7.

FIG. 1 shows the configuration in which two Ethernet switch module units and two NICs are provided, respectively. However, the configuration in which three or more Ethernet switch modules and three or more NICs are provided is also preferable.

Next, an operation of the composite computer system 1 according to this embodiment will be described.

FIG. 2 is a flowchart for the network setting in the composite computer system 1. In FIG. 2, one example where the network setting of the NIC 9 in the CPU blade $5_1$ to a device driver is performed is shown. Operation flows in the management terminal 2, the CPU blade $5_1$, the management module unit 8, and the Ethernet switch module unit 6 are respectively shown from the left side to the right side in FIG. 2.

First, a manager performs network setting to the device driver in the CPU blade $5_1$ from the management terminal 2 (step S101). The setting inputted from the management terminal 2 is inputted to a management agent (a management agent unit) in the CPU blade $5_1$ via the Ethernet switch module unit 6 (signal route K1 in FIG. 1).

When receiving the information about the network setting, the management agent in the CPU blade $5_1$ performs the network setting to the device driver in the CPU blade $5_1$ (step S201).

Subsequently, the management agent in the CPU blade $5_1$ performs the setting of the NIC 9 to the device driver in the CPU blade $5_1$, and prepares network setting information required for the ports in the Ethernet switch module unit 6 connected to the NIC 9 (step S202) and then notifies the prepared network setting information to the management module unit 8 (signal route K2 in FIG. 1) (step S203). In this case, when the reboot of the CPU blade $5_1$ is required after the processing in step S203 has been terminated, the CPU blade $5_1$ is rebooted (step S204).

When the management module unit 8 acquires the network setting information (step S301), the management module unit 8 recognizes which port of each of the Ethernet switch module units 6 and 7 corresponds to the NIC 9 in the CPU blade $5_1$ from the network configuration information (Step S302).

Subsequently, the management module unit 8 then performs the network setting (signal route K3 in FIG. 1) to the port i1 in the recognized Ethernet switch module unit 6 (step S303), and enables the network setting to the port i1 (step S401).

FIG. 3 is an explanatory diagram showing one example of network configuration information possessed by the management module unit 8.

As illustrated in FIG. 3, the network configuration information is constituted of "Ethernet switch module unit number", "internal port number", "CPU blade number", "NIC number", and "MAC address of NIC".

The Ethernet switch module unit number indicates the number of the Ethernet switch module unit 6 or 7. The internal port number indicates an internal port number of a port connected with either of the CPU blades $5_1$ to $5_N$ in the Ethernet switch module unit indicated by the Ethernet switch module unit number.

The CPU blade number indicates the number of each of the CPU blades $5_1$ to $5_N$ connected to the Ethernet switch module unit indicated by the Ethernet switch module unit number. The NIC number indicates the number of the NIC connected to the Ethernet switch module unit indicated by the Ethernet switch module unit number, and the MAC address of NIC indicates a MAC (Media Access Control) address of the NIC.

Next, a communication processing (processing in steps S203 and S301 in FIG. 2) performed when the management module unit 8 acquires the network setting information from the management agent of the CPU blade $5_1$ (to $5_N$) will be described with reference to the flowchart shown in FIG. 4.

In FIG. 4, a communication processing flow of the management agent of the CPU blade $5_1$ and a communication processing flow of the management module unit 8 are shown on the left side and the right side, respectively.

First, when the management agent of the CPU blade $5_1$ is actuated (step S501), the management module unit 8 confirms that the management agent has been actuated (step S601). Subsequently, the management module unit 8 performs polling to the management agent at constant intervals (step S602) to confirm whether the network setting information has been updated.

When the management agent changes the network setting information of the port based upon the change in network setting of the device driver (step S502), the management module unit 8 confirms that the network setting information has been changed (step S603) to acquire the changed network setting information from the management agent (step S604).

The communication route 4b utilized when acquiring the network setting information from the management agent of the CPU blade $5_1$ may be a LAN (Local Area Network), an I2C (Inter IC Bus), or the like.

FIG. 5 is a flowchart showing another example of the communication processing in FIG. 4, in which a communication processing performed through event notification is shown.

Also in FIG. 5, the communication processing flow of the management agent of the CPU blade $5_1$ and the communication processing flow of the management module unit 8 are shown on the left side and the right side, respectively.

When the management agent of the CPU blade $5_1$ changes the network setting information of the port based upon the change in network setting of the device driver (step S701), the management agent notifies the network setting information to the management module unit 8 as an event (step S702).

After the management module unit 8 receives the event, it notifies an acquisition confirming notification for confirming the reception of the event to the management agent (step S801).

FIG. 6 is an explanatory diagram showing one example of a data structure of the network setting information outputted from the management agent of the CPU blade $5_1$ to the management module unit 8.

As shown in FIG. 6, the data structure of the network setting information constituted of "communication protocol header", "NIC information data" indicating the NICs in the CPU blades $5_1$ to $5_N$ to which the setting is to be performed, and a plurality of "network setting information data elements 1 to n" including data for performing the setting of the Ethernet switch module.

A communication protocol of the network setting information is not specifically limited, but various communication protocols including, for example, TCP (Transmission Control Protocol), a unique protocol using UDP (User Datagram Protocol), a standard protocol such as IPMI (Intelligent Platform Management Interface), and the like can be used.

FIG. 7 is an explanatory diagram showing setting contents in the blade server 3 when the setting of Tag-VLAN is performed as network setting.

The setting content of the device driver shown in the left side in FIG. 7 is the content which is set to the device driver by the management agent in the processing at steps S101 and S201 in FIG. 2, and the management agent performs, to the device driver, the setting of the number of Tag-VLANs, the setting of Tag-VLAN ID, the setting of IP address to the Tag-VLAN, the setting to enable GVRP (GARP VLAN Registration Protocol), and the like.

Communication data between the management agent and the management module unit shown at a central part of the diagram shown in FIG. 7 shows the, content of the network setting information data (FIG. 6) notified from the management agent to the management module unit 8 in the processing at steps S203 and S301 shown in FIG. 2, and the MAC address information of NIC, the CPU blade number information of NIC, the Tag-VLAN ID, the Priority information to the Tag-VLAN ID, the setting to enable, GVRP and the like are notified together with the NIC information data (FIG. 6).

The setting content of Ethernet switch port shown on the right side in FIG. 7 is the content which is set to the port of the Ethernet switch module unit by the management module unit 8 in the processing at steps S 303 and S401 shown in FIG. 2, and the management module unit 8 performs the setting of Tag-VLAN ID, the setting of Priority to the Tag-VLAN ID, the setting of CoS class of a switch to the Priority, the setting to enable GVRP (GARP VLAN Registration Protocol), and the like based upon the network setting information data and network configuration information (FIG. 3).

FIG. 8 is an explanatory diagram showing setting content in the blade server 3 when the setting of an adapter fault tolerant is performed as the network setting.

Similar to FIG. 7, the setting content of the device driver, the communication data between the management agent and the management module unit, and the setting content of the Ethernet switch port are respectively shown from the left side to the right side in FIG. 8.

The setting content of the device driver is the content which is set to the device driver by the management agent (processing at steps S101 and S201 in FIG. 2), and the management agent performs the setting of teaming NIC (teaming Ethernet interface controller), the setting of IP address, and the setting of adapter fault tolerant to the device driver, respectively.

The communication data between the management agent and the management module unit shows the content of the network setting information (FIG. 6) which is notified from the management agent to the management module unit 8 (processing at steps S203 and S301 in FIG. 2), and the MAC address information of NIC, CPU blade number information of NIC, setting information of a spanning tree protocol, and the like are notified together with the NIC information data (FIG. 6).

The setting content of the Ethernet switch port is the content of setting which is performed to the port of the Ethernet switch module unit by the management module unit 8 (processing at steps S303 and S401 in FIG. 2), and the management module unit 8 performs the setting of the spanning tree protocol.

FIG. 9 is an explanatory diagram showing the setting content in the blade server 3 when the setting of switch fault tolerant is performed as the network setting.

Similar to FIGS. 7 and 8, the setting content of the device driver, the communication data between the management agent and the management module unit, and the setting content of the Ethernet switch port are respectively shown from the left side to the right side in FIG. 9.

The setting content of the device driver is the content which is set to the device driver by the management agent (processing at steps S101 and S201 in FIG. 2), and the management agent performs the setting of teaming NIC, the setting of IP address, and the setting of switch fault tolerant to the device driver, respectively.

The communication data between the management agent and the management module unit shows the content of the network setting information data (FIG. 6) which is notified from the management agent to the management module unit 8 (processing at steps S203 and S301 in FIG. 2), and MAC address information of NIC, CPU blade number information of NIC, setting information of spanning tree protocol, and the like are notified together with the NIC information data (FIG. 6).

The setting content of the Ethernet switch port is the content of setting (processing at steps S303 and S401 in FIG. 2) which is performed to the port of the Ethernet switch module unit by the management module unit 8, and the management module unit 8 performs the setting of the spanning tree protocol.

FIG. 10 is an explanatory diagram showing the setting content in the blade server 3 when the setting of load balancing is performed as the network setting.

Similar to FIGS. 7 to 9, the setting content of the device driver, the communication data between the management agent and the management module unit, and the setting content of the Ethernet switch port are respectively shown from the left side to the right side in FIG. 10.

The setting content of the device driver which is set to the device driver by the management agent (processing at steps S101 and S201 in FIG. 2) includes the setting of teaming NIC, the setting of IP address, the setting of load balancing, and the like.

The communication data between the management agent and the management module unit which is notified from the management agent to the management module unit 8 (the processing at steps S203 and S301) includes the MAC address information of NIC, the CPU blade number information of NIC, the setting information of load balancing, and the like.

The setting content of the Ethernet switch port which is set to the port of the Ethernet switch module unit by the management module unit 8 (processing at steps S303 and S401 in FIG. 2) includes the setting of load balancing.

According to this embodiment, as described above, since the network settings to the CPU blades $5_1$ to $5_N$, and the Ethernet switch module units 6 and 7 can be achieved by only one setting operation, the occurrence of setting error can be significantly reduced and the operation and management control of the composite computer system 1 can be performed easily at low cost.

Also, in this embodiment, the example where the blade server 3 is comprised of the CPU blades $5_1$ to $5_N$, the Ethernet switch module units 6 and 7, and the management module unit 8 has been described. However, the blade server 3 is not limited to this.

Figure 11:
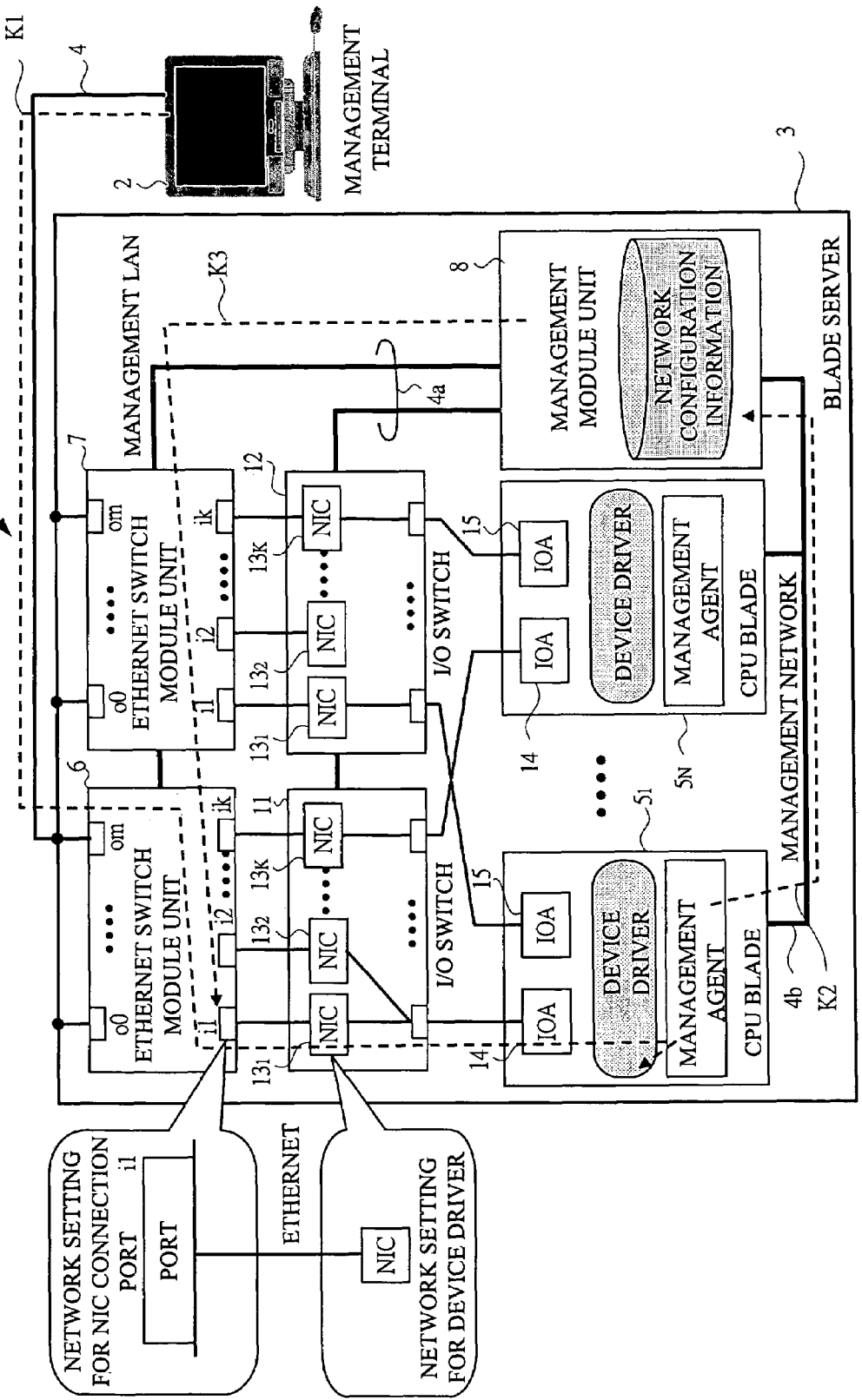
FIG. 11 is a block diagram of a composite computer system according to another embodiment of the invention.

FIG. 11 is a block diagram showing another configuration example of the blade server 3 provided in the composite computer system 1.

In this case, the blade server 3 has the configuration in which I/O (Input/Output) switches 11 and 12 are newly provided in addition to the CPU blades $5_1$ to $5_N$, the Ethernet switch module units 6 and 7, and the management module unit 8 shown in FIG. 1.

The I/O switches 11 and 12 are provided between the CPU blades $5_1$ to $5_N$ and the Ethernet switch module units 6 and 7, and the I/O switches 11 and 12 are each provided with NICs $13_1$ to $13_K$.

The NICs $13_1$ to $13_K$ of the I/O switch 11 are connected with respective ports of the Ethernet switch module unit 6, and the NICs $13_1$ to $13_K$ of the I/O switch 12 are connected with respective ports of the Ethernet switch module unit 7.

The I/O switches 11 and 12 are each provided with a plurality of ports, and the ports are connected to the I/O adapters 14 and 15 provided in the CPU blades $5_1$ to $5_N$, respectively. The NICs $13_1$ to $13_K$ are each connected to an arbitrary I/O adapter by the switching control of the I/O switches 11 and 12.

With such a configuration, the connection relationship between the CPU blades $5_1$ to $5_N$ and the NICs $13_1$ to $13_K$ by the I/O switches 11 and 12 can be set flexibly (for example, a plurality of NICs are connected to the CPU blade $5_1$).

Also in this case, when network setting to a device driver in any CPU blade is performed from the management terminal 2, the setting inputted from the management terminal 2 is inputted to the management agent in the CPU blade $5_1$ via the Ethernet switch module unit 6 and the I/O switch 11 (signal route K1 in FIG. 11), and the setting of network to the device driver of the CPU blade $5_1$ is performed by the management agent of the CPU blade $5_1$.

Subsequently, the management agent in the CPU blade $5_1$ performs the setting of an arbitrary NIC to the device driver in the CPU blade $5_1$ and creates the network setting information required for the port in the Ethernet switch module unit 6 connected to the NIC to notify the information to the management module unit 8 (signal route K2 in FIG. 11). The management module unit 8 recognizes a port of each Ethernet switch module unit 6 or 7 corresponding to any NIC in the CPU blade $5_1$ and performs the network setting to the port in the recognized Ethernet switch module unit 6 (signal route K3 in FIG. 11) to enable the network setting to the port.

With such a constitution, since he network setting to the CPU blades $5_1$ to $5_N$, and the Ethernet switch module units 6 and 7 can be achieved by only one setting operation, occurrence of setting error can be significantly reduced, and the operation and management control of the composite computer system 1 can be performed easily at low cost.

In the foregoing, the invention made by the inventor of the present invention has been concretely described based on the embodiments. However, it is needless to say that the present invention is not limited to the foregoing embodiments and various modifications and alterations can be made within the scope of the present invention.

For example, in the embodiment described above, the configuration in which the Ethernet switch module unit and the management module unit are separated from each other has been employed. However, they may be constituted as one module unit.

The managing method of an input and output interface module in the computer system according to the present invention is suitable for an energy saving technology for operation and maintenance control in a composite computer apparatus.

What is claimed is:

1. A composite computer apparatus comprising:
   a plurality of CPU module units, each of the plurality of CPU module units being mounted with at least one Ethernet interface controller and a processor;
   at least one Ethernet switch module unit which is provided with a plurality of internal ports and an external port, wherein each of the plurality of internal ports is connected to the at least one Ethernet interface controller of each of said plurality of CPU module units via Ethernet and wherein the external port is connected to an external network; and a management module unit which is connected to said plurality of CPU module units and said at least one Ethernet switch module unit and performs management of said plurality of CPU module units, wherein said management module unit has network configuration information showing a correspondence relationship between the at least one Ethernet interface controller of each of said plurality of CPU module units and a corresponding internal port of the plurality of internal ports, and of the at least one Ethernet switch module unit, wherein each of said plurality of CPU module units has a device driver which sets said at least one Ethernet interface controller on a corresponding CPU module unit, of said plurality of CPU module units, and a management agent unit performing setting of the device driver of said at least one Ethernet interface controller through communication with a management terminal, which is externally connected to said composite computer apparatus for performing management of said composite computer apparatus, wherein when network setting is performed to the at least one Ethernet interface controller of one of said plurality of CPU module units through the communication with said management terminal, said corresponding CPU module unit performs network setting of the at least one Ethernet interface controller of said corresponding CPU module unit to said management agent unit operating on said corresponding CPU module unit through the communication with said management terminal at a time of a setting of a corresponding internal port of the at least one Ethernet switch module unit connected to said at least one Ethernet interface controller, wherein said management agent unit performs setting to the device driver of the at least one Ethernet interface controller of said corresponding CPU module unit and creates network setting information required for the corresponding internal port of the at least one Ethernet switch module unit connected to the at least one Ethernet interface controller of said corresponding CPU module unit to notify the network setting information to said management module unit, and wherein said management module unit identifies one internal port of the plurality of internal ports, and of the at least one Ethernet switch module unit to be set from said network configuration information to perform network setting in accordance with said network setting information to the identified one of the plurality of internal ports, and of said at least one Ethernet switch module unit.

2. A composite computer apparatus comprising:

a plurality of CPU module units, each of the plurality of CPU module units being provided with at least one I/O adapter and a processor;

at least one I/O switch module unit which has a plurality of Ethernet interface controllers, and connects each said at least one I/O adapter of each of said plurality of CPU module units to one of said plurality of Ethernet interface controllers via an I/O switch;

at least one Ethernet switch module unit which is provided with a plurality of internal ports and a plurality of external ports wherein each of the plurality of internal ports is connected with each of the plurality of Ethernet interface controllers of said at least one I/O switch module unit via Ethernet, and wherein each of the plurality of external ports is connected to an external network; and at least one management module unit which is connected to said plurality of CPU module units, said at least one I/O switch module unit, and said at least one Ethernet switch module unit, and performs management of said plurality of CPU module units, wherein said at least one management module unit performs control of said at least one I/O switch module unit to be capable of changing a number of said plurality of Ethernet interface controllers to be allocated to each of said plurality of CPU module units, wherein said at least one management module unit has network configuration information showing a correspondence relationship between each of the plurality of Ethernet interface controllers of each of said plurality of CPU module units and a corresponding internal port of the plurality of internal ports, and of the at least one Ethernet switch module unit, wherein each of said plurality of CPU module units has a device driver which sets at least one said plurality of Ethernet interface controllers on a corresponding CPU module unit of the plurality of CPU module units, and a management agent unit performing setting of the device driver into said at least one Ethernet interface controller through communication with a management terminal which is externally connected to said composite computer apparatus for performing management of said composite computer apparatus, wherein when network setting is performed to one of the plurality of Ethernet interface controllers through the communication with said management terminal, said corresponding CPU module unit performs network setting of the one of the plurality of Ethernet interface controllers of said corresponding CPU module unit to said management agent unit operating on said corresponding CPU module unit through the communication with said management terminal at a time of the setting of the corresponding internal port of the at least one Ethernet switch module unit connected to said one of the plurality of Ethernet interface controllers, wherein said management agent unit performs setting to the device driver of the one of the plurality of Ethernet interface controllers of said corresponding CPU module unit and creates network setting information required for the corresponding internal port of the at least one Ethernet switch module unit connected to the one of the plurality of Ethernet interface controllers of said corresponding CPU module unit to notify the network setting information to said at least one management module unit, and wherein said at least one management module unit identifies one internal port of the plurality of internal ports, and of the at least one Ethernet switch module unit to be set from said network configuration information to perform network setting in accordance with said network setting information to the identified one of the internal ports of the plurality of internal ports, and of said at least one Ethernet switch module unit.

3. A management method of a composite computer apparatus, wherein said composite computer apparatus includes a plurality of CPU module units, each having at least one Ethernet interface controller and a processor, at least one Ethernet switch module unit which is provided with a plurality of internal ports and an external port, wherein each of the plurality of internal ports is connected to the at least one Ethernet interface controller of said plurality of CPU module units via Ethernet and wherein the external port is connected to an external network, and at least one management module unit which is connected to said plurality of CPU module units and said at least one Ethernet switch module unit and performs management of said plurality of CPU module units, said method comprising:

performing network setting to the at least one Ethernet interface controller of one of said plurality of CPU module units by inputting network setting information of the plurality of internal ports of the at least one Ethernet switch module unit connected to said at least one Ethernet interface controller;

receiving, by a management agent unit provided in the one of said plurality of CPU module units, the network setting information of the plurality of internal ports of the at least one Ethernet switch module unit;

setting, by said management agent unit, setting of a device driver of the one of said plurality of CPU module units and creating the network setting information required for the plurality of internal ports of said at least one Ethernet switch module unit connected to the at least one Ethernet interface controller of the one of said plurality of CPU module units, and notifying, by said management agent unit, the network setting information to said at least one management module unit;

identifying, by said at least one management module unit, one internal port of the plurality of internal ports, and of the at least one Ethernet switch module unit to be set from network configuration information showing a correspondence relationship between the at least one Ethernet interface controller of the one of said plurality of CPU module units and the identified one of the internal ports of the plurality of internal ports, and of said at least one Ethernet switch module unit; and setting by said at least one management module unit, a network setting in accordance with said network setting information the identified one of the internal ports of the plurality of internal ports, and of said at least one Ethernet switch module unit.

4. The management method according to claim 3, further comprising:

providing, with respect to each at least one Ethernet interface controller provided in said one of said plurality of CPU module units and the plurality of internal ports of the said at least one Ethernet switch module unit connected to said at least one Ethernet interface controller, a correspondence table including at least one information of a number for each of said at least one Ethernet switch module unit, a number for each of said plurality of internal ports, a number for said one of said plurality of CPU module units, a number for said plurality of CPU module units of said at least one Ethernet interface controller, and a MAC address of said at least one Ethernet interface controller, as the network configuration information possessed by said at least one management module unit.

5. The management method according to claim 2, further comprising:

changing a correspondence relationship between said at least one Ethernet interface controller and said one of said plurality of CPU module units in said correspondence table of the network configuration information when connection of said one of said plurality of CPU module units and the at least one Ethernet interface controller of said at least one I/O switch module unit is changed by the control of said at least one I/O switch module unit which has a plurality of Ethernet interface controllers and connects said plurality of Ethernet interface controllers and one I/O adapter of said one of said plurality of CPU module units with an I/O switch.

6. The management method according to claim 3, when the network setting information is notified from said management agent unit to said at least one management module unit, confirming, by said at least one management module unit, through said management agent unit that said network setting information has been updated at constant time intervals after confirmation of actuation of said management agent; and when network setting is performed to the at least one Ethernet interface controller of said one of said plurality of CPU module units, recognizing, by said management agent unit that the network configuration information from which said network setting information has been created has been updated at a time of the setting of the one of the internal ports of the plurality of internal ports, and of said at least one Ethernet switch module unit connected to said at least one Ethernet interface controller, and acquiring, by said at least one management module unit said network setting information.

7. The management method according to claim 3, further comprising:

wherein, when the network setting information is notified from said management agent unit to said at least one management module unit, and when network setting is performed to the at least one Ethernet interface controller of said one of said plurality of CPU module units, notifying, by said management agent unit the network setting information to said at least one management module unit as an event at a time of setting the identified one of the internal ports of the plurality of internal ports, and of the at least one Ethernet switch module connected to said at least one Ethernet interface controller.

8. The management method according to claim 3, wherein data structure of the network setting information notified from said management agent unit to said at least one management module unit includes a communication protocol header, at least one Ethernet interface controller information data indicating which at least one Ethernet interface controller in said one of said plurality of CPU module units is to be set, and at least one network setting information for setting said at least one Ethernet switch module unit.

9. The management method according to claim 3, further comprising:

setting at least one Tag-VLAN (Virtual Local Area Network) as the network setting, wherein, when setting of each at least one Tag-VLAN is performed as the network setting in said composite computer apparatus, said management agent unit includes at least one of setting of a number of Tag-VLANs, setting of a Tag-VLAN ID of the at least one Tap-VLAN, setting of an IP (Internet Protocol) address to the at least one Tag-VLAN, and setting to enable GVRP as setting contents of said device driver, wherein MAC address information data of said at least one Ethernet interface controller, CPU module unit number information data of said at least one Ethernet interface controller, and Tag-VLAN ID data whose setting has been performed by said management agent unit, Priority information data to the Tag-VLAN ID, and data of setting to enable GVRP are included as contents of the network setting information notified from said management agent unit to said at least one management module unit, and wherein a setting of the Tag-VLAN ID, a Priority setting to the Tag-VLAN ID, a setting of CoS class of a switch to the Priority setting, and a setting to enable GVRP are included as contents of the network setting information of the plurality of internal ports of said at least one Ethernet switch module unit by said at least one management module unit.

10. The management method according to claim 3,
wherein, when setting of an adapter fault tolerant is performed as the network setting in said composite computer apparatus:
said management agent unit includes at least one of teaming setting of the at least one Ethernet interface controller, setting of IP address, and setting of adapter fault tolerant,
MAC address information data of the at least one Ethernet interface controller, CPU module unit number information data of the at least one Ethernet interface controller, and setting information of a spanning tree protocol whose setting has been performed by said management agent unit are included as contents of the network setting information notified from said management agent unit to said at least one management module unit, and
setting of the spanning tree protocol is included as contents of setting which is performed to the plurality of internal ports of said at least one Ethernet switch module unit by said at least one management module unit.

11. The management method according to claim 3,
wherein, when setting of a switch fault tolerant is performed as the network setting in said composite computer apparatus:
said management agent unit includes at least one of teaming setting of the at least one Ethernet interface controller, setting of IP address, and setting of adapter fault tolerant,
MAC address information data of the at least one Ethernet interface controller, CPU module unit number information data of the at least one Ethernet interface controller, and setting information of a spanning tree protocol whose setting has been performed by said management agent unit are included as contents of the network setting information notified from said management agent unit to said at least one management module unit, and
setting of the spanning tree protocol is included as contents of setting which is performed to the plurality of internal ports of said at least one Ethernet switch module unit by said at least one management module unit.

12. The management method according to claim 3,
wherein, when setting of load balancing is performed as the network setting in said composite computer apparatus:
said management agent unit includes at least one of teaming setting of the at least one Ethernet interface controller, setting of IP address, and load balancing,
MAC address information data of the at least one Ethernet interface controller, CPU module unit number information data of the at least one Ethernet interface controller, and setting information of the load balancing whose setting has been performed by said management agent unit are included as contents of the network setting information notified from said management agent unit to said at least one management module unit, and
setting of the load balancing is included as contents of setting which is performed to the plurality of internal ports of said at least one Ethernet switch module unit by said at least one management module unit.

* * * * *